United States Patent [19]

Hollister

[11] 4,119,889
[45] Oct. 10, 1978

[54] METHOD AND MEANS FOR IMPROVING THE EFFICIENCY OF LIGHT GENERATION BY AN ELECTRODELESS FLUORESCENT LAMP

[76] Inventor: Donald D. Hollister, 2031 Tweed St., Placentia, Calif. 92670

[21] Appl. No.: 768,478

[22] Filed: Feb. 14, 1977

Related U.S. Application Data

[63] Continuation-in-part of Ser. No. 604,226, Aug. 13, 1975, Pat. No. 4,010,400.

[51] Int. Cl.$^2$ .................... H05B 41/16; H05B 41/24
[52] U.S. Cl. .................................. 315/248; 313/116; 315/39; 315/344
[58] Field of Search ...................... 315/248, 344, 39; 313/113, 116, 488

[56] References Cited

U.S. PATENT DOCUMENTS

| | | | |
|---|---|---|---|
| 3,225,241 | 12/1965 | Spencer et al. | 313/488 |
| 3,521,120 | 7/1970 | Anderson | 315/248 X |
| 3,987,331 | 10/1976 | Schreurs | 313/113 |

*Primary Examiner*—Saxfield Chatmon, Jr.
*Attorney, Agent, or Firm*—Philip M. Hinderstein

[57] ABSTRACT

In an electrodeless fluorescent lamp of the type including a sealed, light transmissive, envelope including an elongate inner wall defining an open-ended cavity and an outer wall surrounding the inner wall to form a generally annular, hollow cavity therebetween, the annular cavity being charged with an ionizable gaseous medium, an induction coil positioned within the open-ended cavity, and a radio frequency oscillator connected to the coil, the coil and the oscillator initiating and maintaining ionization of the medium to form an ultraviolet light emitting discharge, the inner surface of the outer wall of the envelope being coated with a phosphor which emits visible light when excited by ultraviolet light, the improvement wherein the outer surface of the inner wall is coated with a layer of an electrically insulative ultraviolet light reflective material which is overcoated with a phosphor layer. Such improvement yields an increase in visible light production of the order of 50% to 100%.

8 Claims, 2 Drawing Figures

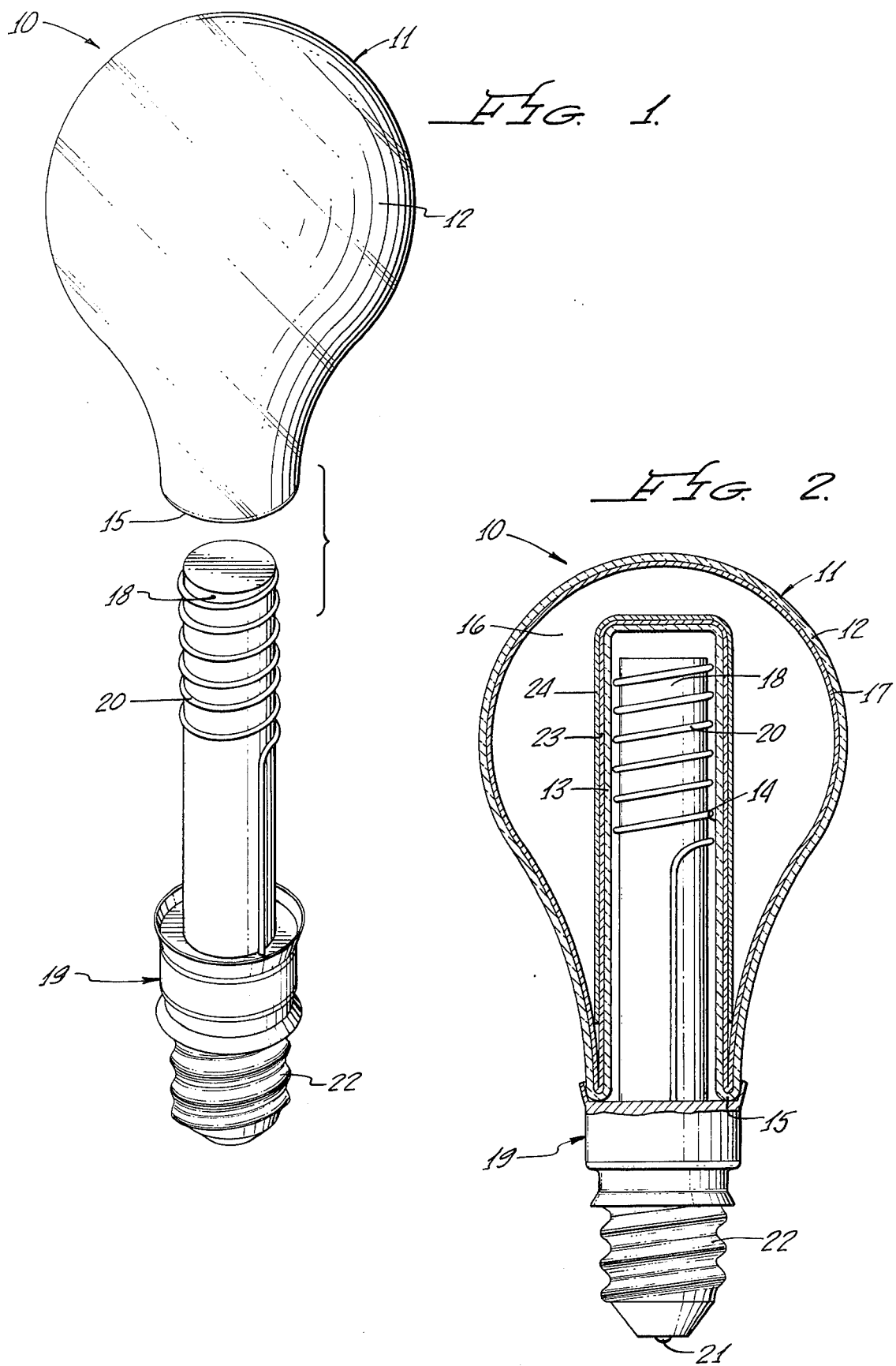

METHOD AND MEANS FOR IMPROVING THE EFFICIENCY OF LIGHT GENERATION BY AN ELECTRODELESS FLUORESCENT LAMP

CROSS-REFERENCE TO RELATED APPLICATION

This application is a continuation-in-part of my copending application Ser. No. 604,226, filed Aug. 13, 1975, now U.S. Pat. No. 4,010,400, and entitled Light Generation By An Electrodeless Fluorescent Lamp.

BACKGROUND OF THE INVENTION

1. Field of the Invention

The present invention relates to a method and means for improving the efficiency of light generation by an electrodeless fluorescent lamp and, more particularly, to a method and means for increasing visible light production by an electrodeless fluorescent lamp of the order of 50% to 100%.

2. Description of the Prior Art

The incandescent lamp is a principal source of lighting in homes and businesses. However, its light emitting filament evaporates and becomes weak with use, hence it is easily fractured or dislodged from its supports. Thus, the lifetime of an incandescent lamp is short and unpredictable. More importantly, the efficiency of an incandescent lamp in converting electrical power to light is very low, e.g. approximately 15 lumens of light per watt of electrical power.

Fluorescent lamps are generally more efficient and durable than incandescent lamps. However, a conventional fluorescent lamp requires both a ballast supply and a special fixture which must be installed before a lamp can be used. Furthermore, the electrodes are subject to disintegration over a period of time.

In my copending U.S. Patent Application Ser. No. 604,226, filed Aug. 8, 1975, and entitled Light Generation By an Electrodeless Fluorescent Lamp, there is disclosed a method and means for producing light from an electrodeless discharge established in an ionizable medium within a sealed envelope. The sealed envelope has therein at least one particular ionizable gas at a given pressure capable of emitting radiant energy when subjected to a radio frequency field. After initiating an electrodeless discharge in the medium, the discharge is maintained by coupling to the medium a radio frequency magnetic induction field having a frequency and magnitude selected to optimize the efficiency of conversion of radio frequency power to light.

Such a lamp eliminates the disadvantages of both incandescent and conventional fluorescent lamps. On the one hand, it eliminates filaments, ballast supplies, and special fixtures. On the other hand, it is capable of efficiencies similar to those conventional fluorescent lamps.

According to the preferred embodiment of that invention, a sealed, light transmissive, envelope including an outer wall which can be shaped as an incandescent lamp bulb is charged with mercury vapor and an inert starting gas, such as argon. Positioned within the outer wall is an elongate inner wall defining an open-ended cavity. A layer of fluorescent light emitting phosphor is disposed on the interior surface of the outer wall. An induction coil is positioned within the open-ended cavity so that a substantial portion of its magnetic induction field passes through the medium. A radio frequency oscillator having a tuned circuit including the coil in series with a capacitor is housed within a base that screws into a conventional incandescent lamp socket. The oscillator generates electrical energy at a radio frequency which is applied to the coil to produce both an electrical field and a magnetic field. The electric field across the coil initiates ionization of the mercury vapor in the envelope and the magnetic induction field maintains such ionization so as to emit ultraviolet light that excites the phosphor to emit visible light.

During the normal operation of such a lamp, it has been found that part of the ultraviolet energy emitted from the electrodeless arc impinges upon the inner wall where it is absorbed by the glass and lost to the system. Provision for a specular reflector on the outer surface of the inner wall, such as may be formed by vapor deposition of aluminum or the like, tends to effectively short-circuit the discharge starting field and, in the absence of at least one longitudinal break in the electrically conductive reflective surface, may also short out the induced discharge maintenance field. On the other hand, if such a coating is provided on the inner surface of the inner wall, the same problem exists together with the additional problem of ultraviolet absorption by the glass inner wall.

Likewise, an external reflector derived from the concept presented in my prior U.S. Pat. No. 3,860,854 provides no viable solution for identical reasons. In any event, all of these means are costly and therefore undesirable if alternate, less expensive, effective means are available.

SUMMARY OF THE INVENTION

According to the present invention, the radially outer surface of the inner wall of such an electrodeless fluorescent lamp is coated with an electrically insulative, ultraviolet and visible light reflective material, such as magnesium oxide or zirconium dioxide or the like, which layer can further be overcoated with standard phosphors. The coating of ultraviolet light reflective material effectively serves as a diffuse reflector of ultraviolet radiation incident on the inner wall of the envelope, thereby enabling utilization of such reflected ultraviolet radiation toward the production of visible light by the lamp's phosphor coating. Typically, such application yields an increase in visible light production of the order of 50% to 100%.

OBJECTS

It is therefore an object of the present invention to provide a method and means for improving the efficiency of light generation by an electrodeless fluorescent lamp.

It is still a further object of the present invention to increase the visible light production of electrodeless fluorescent lamps.

In an electrodeless fluorescent lamp of the type including a sealed light transmissive envelope including an outer wall and an inner wall, it is a still further object of the present invention to coat the outer surface of the inner wall with a layer of an electrically insulative, ultraviolet light reflective material.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is an exploded perspective view of an electrodeless fluorescent lamp constructed in accordance with the teachings of the present invention; and FIG. 2 is a side sectional view, partly in section, of the lamp of FIG. 1.

DESCRIPTION OF THE PREFERRED EMBODIMENT

Referring now to FIGS. 1 and 2, an electrodeless fluorescent lamp, generally designated 10, as described in my beforementioned copending application, includes a sealed light transmissive glass envelope, generally designated 11, having an outer wall 12 which may be shaped as a conventional incandescent lamp. On the other hand, any sealed enclosure such as spherical will suffice. Positioned within outer wall 12 is an elongate, cylindrical inner wall 13 defining an open-ended cavity 14. Outer and inner walls 12 and 13 are secured together adjacent the open end of cavity 14, as shown at 15, to define a generally annular, hollow cavity 16 therebetween.

Cavity 16 is charged with an ionizable gaseous medium, preferrably comprising a mixture of mercury vapor and an inert gas, such as argon. Typically, the partial pressure of the argon would be of the order of 1-5 torr. The purpose of the argon is to facilitate the initiation of a mercury discharge within envelope 11 via the well known Penning effect, as described more fully in my beforementioned copending application. The interior surface of outer wall 12 is coated with a layer 17 of standard phosphors, such as any of the standard halophosphates.

A hollow, cylindrical coil form or mandrel 18 made of any non-conductive, non-magnetic material is dimensioned to fit into cavity 14. One end of mandrel 18 is attached to a base 19 which screws into a conventional incandescent lamp socket. Base 19 houses a radio frequency oscillator (not shown) having a tuned circuit including a capacitor (not shown) in series with an induction coil 20 wrapped around or deposited on the surface of mandrel 18. The sole purpose of mandrel 18 is to support coil 20, so it can be constructed of any suitable low cost material. The end of coil 20 remote from base 19 may be connected to the radio frequency oscillator by a shielded lead passing through the hollow center of mandrel 18.

Base 19 has contacts 21 and 22 through which standard 120 volt - 60 cycle alternating power is supplied to the radio frequency oscillator. When envelope 10 and base 19 are assembled, the field produced by coil 20 lies in close proximity to the ionizable medium within envelope 11 so that the radio frequency power from the oscillator can be efficiently coupled to the medium, from a physical point of view.

As described more fully in my beforementioned copending application, the radio frequency oscillator within base 19 is designed to induce a sufficiently high voltage across coil 20 when the lamp is initially energized so that the resulting electric field breaks down the mercury vapor, without an external starter circuit. Simultaneously, radio frequency power from the oscillator is coupled to the discharge through the magnetic induction field of coil 20 to form an electrodeless arc discharge. The ionized mercury vapor predominantly emits ultraviolet light having a wavelength of 253.7 nanometers. Part of the ultraviolet light passes outwardly to layer 17, where it is absorbed by and excites the phosphor, which emits visible light suitable for illumination. The remainder of the ultraviolet light passes inwardly towards inner wall 13. In the absence of a coating on inner wall 13, such ultraviolet light would be absorbed by the glass of which inner wall 13 is fabricated and lost to the system, since glass is opaque to the incident 253.7 nanometer radiation.

According to the present invention, the radially outer surface of inner wall 13, i.e. the surface within cavity 16, is coated with a layer 23 of an electrically insulative, ultraviolet and visible light reflective material, such as magnesium oxide or zirconium dioxide or the like, layer 23 preferably being overcoated with a layer 24 of standard phosphors of the type described previously. Layer 23 effectively serves as a diffuse reflector of ultraviolet radiation incident on inner wall 13, thereby enabling utilization of such reflected ultraviolet light toward the production of visible light by the phosphor coating in lamp 10.

In other words, the portion of the ultraviolet light which extends inwardly toward cavity 14 is either absorbed by layer 24 or reflected back outwardly by layer 23 into the interior of envelope 11 without passing through glass wall 13. Visible light emitted by layer 24 is also reflected back into the interior of envelope 11 by layer 23. This visible light passes through layer 12 and envelope 11 to contribute to the overall illumination provided by lamp 10. By virtue of the existence of layer 23, loss of ultraviolet or visible light through inner wall 13 is avoided and by virtue of the position of layer 23 inside envelope 11, attenuation of the ultraviolet light by useless transmission through the glass wall of envelope 11 is avoided.

The manner in which the present method and means for enhancing electrodeless lamp efficiency operates is best demonstrated by example. Such an example is provided by the direct measurement of luminous flux emitted from each of six test lamps fabricated identically in every respect except for coating, each being sequentially operated within an integrating sphere employing a fixed electrodeless power supply at a fixed position within the sphere, at a fixed level of operating power. The details of such a test are given in the following table:

| Lamp | Wall 13 Coating | Wall 12 Coating | Luminous Efficacy | Relative Efficiency |
|---|---|---|---|---|
| A | None | None | 7.5 lpw | 0.25 |
| B | MgO | None | 8 lpw | 0.27 |
| C | MgO/Cool White | None | 21 lpw | 0.70 |
| D | None | Cool White | 30 lpw | 1.00 |
| E | MgO | Cool White | 44 lpw | 1.47 |
| F | MgO/Cool White | Cool White | 55 lpw | 1.83 |

The basic coating initially employed in electrodeless fluorescent lamps is that of lamp D above; namely, wall 13 having no coating and wall 12 having a phosphor coating. At a total input operating AC power level of 20 watts, such a lamp produces approximately 600 lumens or 30 lumens per watt (lpw). Arbitrarily, this lamp is assigned a relative efficiency of 1.00.

Referring to the table above, lamp A, having no coating on inner wall 13 and no coating on outer wall 12, shows a luminous efficacy of 7.5 lpw and a relative efficiency of 0.25, suggesting that 25% of the lumens produced by lamp D is produced directly by the mercury vapor discharge.

Coating the outer surface of inner wall 13 with magnesium oxide, as is the case with lamp B, has very little effect on the luminous efficacy of the lamp. On the other hand, coating inner wall 13 with magnesium oxide and overcoating such layer with a phosphor substantially increases the luminous efficacy, since some of the ultraviolet light incident on inner wall 13 is converted to visible light.

When layer 17 of phosphor is added to the inner surface of outer wall 12 and layer 23 of magnesium oxide is added to the outer surface of inner wall 13, it is observed that the visible light produced by the electrodeless fluorescent lamp is enhanced by 47%, as indicated by lamp E in the table above. Examination of the enhancement of visible light produced by a clear lamp with wall 13 coated with magnesium oxide indicates that the increased efficiency of lamp E must be due to diffuse reflection of ultraviolet energy, since an appreciable enhancement of visible light is not observed in the case of lamp B.

Overcoating of the MgO layer 23 with phosphor material enables the conversion of the salvaged ultraviolet light into visible light, as evidenced by the dramatic increase in electrodeless lamp relative efficiency observed in the case of lamp F. Thus, the processes of overcoating inner wall 13 results in an increase in an electrodeless lamp luminous efficacy from 30 lumens per watt for the basic lamp to 55 lumens per watt for the case of the overcoated wall 13, an increase of 83%.

Moreover, it has been found that efficient color mixing can be effected when special phosphors are applied to the outer surface of wall 13 to achieve special results. Thus, the color rendering characteristics of common halophosphate (i.e. cool or warm light) coated electrodeless lamps can be substantially improved by overcoating layer 23 with a red phosphor layer 24, such as magnesium fluorogermanate or the like, which would have the result of a several percent enhancement in the lamps luminous efficacy. Similar results obtain when other overcoat materials are employed.

While the invention has been described with respect to a preferred physical embodiment construed in accordance therewith, it will be apparent to those skilled in the art that various modifications and improvements may be made without departing from the scope and spirit of the invention. For example, while magnesium oxide and zirconium dioxide are suggested as suitable electrically insulative, ultraviolet and visible light reflective materials, it will be obvious to those skilled in the art that any electrically insulative material which reflects ultraviolet and visible light may be used. Accordingly, it is to be understood that the invention is not to be limited by the specific illustrative embodiment, but only by the scope of the appended claims.

I claim:

1. In an elctrodeless fluorescent lamp of the type including a sealed, light transmissive, envelope including an elongate inner wall defining an open-ended cavity and an outer wall surrounding the inner wall forming a generally annular, hollow cavity therebetween, said annular cavity being charged with an ionizable gaseous medium, an induction coil positioned within said open-ended cavity, and a radio frequency oscillator connected to said coil, said coil and said oscillator causing ionization of said medium to form an ultraviolet light emitting discharge, the inner surface of said outer wall of said envelope being coated with a phosphor which emits visible light when excited by ultraviolet light, the improvement wherein:

the surface of said inner wall in said annular cavity is coated with a layer of an electrically insulative, ultraviolet light reflective material.

2. In an electrodeless fluorescent lamp according to claim 1, the improvement wherein said layer is also reflective of visible light.

3. In an electrodeless fluorescent lamp according to claim 1, the improvement wherein:

said electrically insulative, ultraviolet light reflective material is magnesium oxide.

4. In an electrodeless fluorescent lamp according to claim 1, the improvement wherein:

said electrically insulative, ultraviolet light reflective material is zirconium dioxide.

5. In an electrodeless fluorescent lamp according to claim 1, the improvement wherein:

said layer of an electrically insulative, ultraviolet light reflective material is overcoated with a phosphor layer.

6. In an electrodeless fluorescent lamp according to claim 5, the improvement wherein:

said ultraviolet light reflective layer is also reflective of visible light.

7. In an electrodeless fluorescent lamp according to claim 5, the improvement wherein:

said electrically insulative, ultraviolet light reflective material is magnesium oxide.

8. In an electrodeless fluorescent lamp according to claim 5, the improvement wherein.

said electrically insulative, ultraviolet light reflective material is zirconium dioxide.

* * * * *